June 12, 1951   H. W. SCHULZE   2,556,450

HEATING CIRCUIT CONTROL FOR ELECTRIC APPLIANCES

Filed May 20, 1949

INVENTOR.
Herman W. Schulze

BY Smith, Olsen & Baird
Attys.

Patented June 12, 1951

2,556,450

UNITED STATES PATENT OFFICE 2,556,450

HEATING CIRCUIT CONTROL FOR ELECTRIC APPLIANCES

Herman W. Schulze, Elmwood Park, Ill., assignor to Hotpoint Inc., a corporation of New York Application May 20, 1949, Serial No. 94,480

11 Claims. (Cl. 219—20)

The present invention relates to heating circuit controls for electric appliances and to combination manual and clock-operated selector switches that are expressly designed for use in controlling heating circuits.

In an electric heating appliance, such, for example, as an electric range, it has been proposed to provide a heating control system including a master selector switch operative to select the heating circuit of any one of a plurality of heating units and a clock-controlled switch operative to close and to open at predetermined times the selected heating circuit. Also in the proposed system each heating circuit is provided with an individual control switch for the purpose of setting the individual heating connections to the associated heating unit; and the heating circuit extending to the oven incorporating in the electric range further includes a temperature responsive switch for regulating the temperature of the oven.

While this proposed arrangement is generally satisfactory, it is rather expensive to manufacture since it includes so many different individual switches and is not as flexible in operation as is desirable since it does not permit of the selection of every combination of heating units to be clock controlled.

Accordingly, it is a general object of the present invention to provide in an electric heating appliance an improved heating control system that is completely flexible permitting the selection of any combination of heating units to be clock controlled and incorporating an improved combination manual and clock-operated selector switch.

Another object of the invention is to provide an improved combination manual and clock-operated selector switch of simple and rugged construction that is economical to manufacture and easy to operate.

A further object of the invention is to provide an improved electric range including a combination manual and clock-operated selector switch of the type noted in order to simplify the controls that are performed by the cook.

Further features of the invention pertain to the particular arrangement of the elements of the combination manual and clock-operated selector switch and of the electric heating system, whereby the above-outlined and additional operating features thereof are attained.

Figure 1:
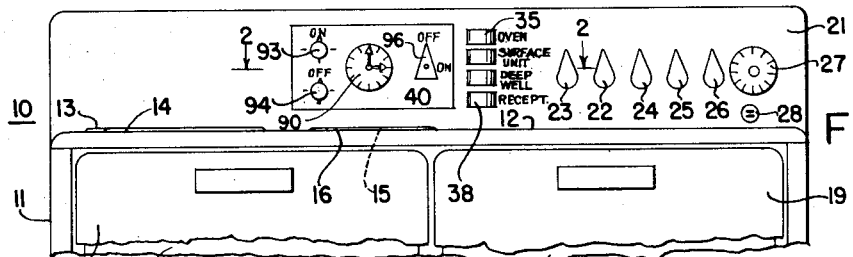
Figure 2:
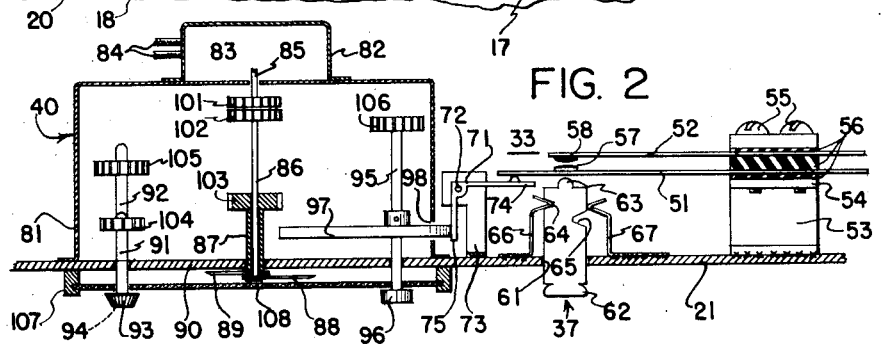
Figure 3:
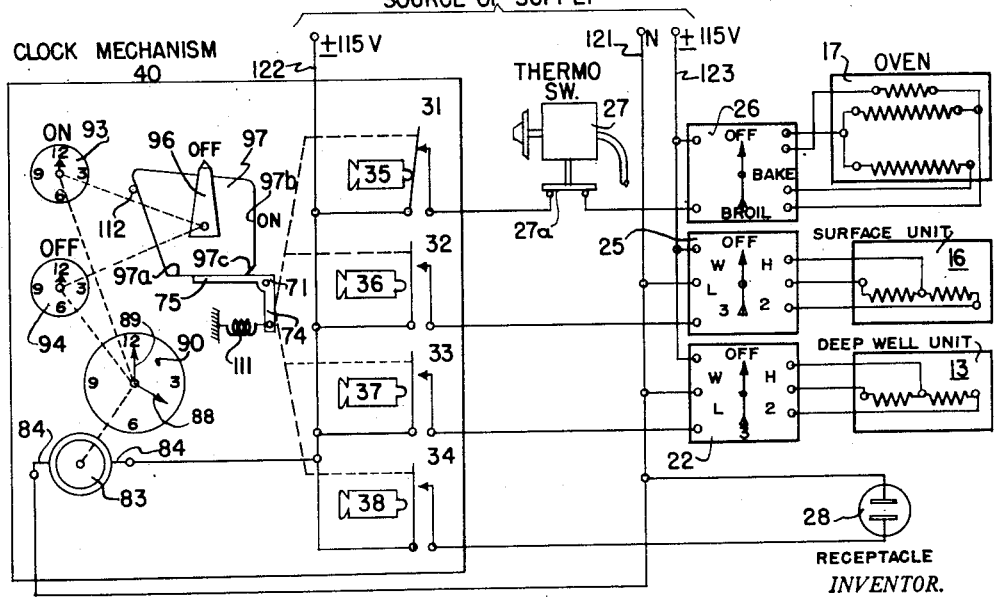

The invention, both as to its organization and method of operation, together with further objects and advantages thereof, will best be understood by reference to the following specification taken in connection with the accompanying drawing, in which Figure 1 is a fragmentary front elevational view of the upper portion of an electric range provided with a heating control system including a combination manual and clock-operated selector switch and embodying the present invention; Fig. 2 is an enlarged horizontal sectional view of the combination manual and clock-controlled selector switch, taken in the direction of the arrows along the line 2—2 in Fig. 1; and Fig. 3 is a diagrammatic illustration of a portion of the heating control system incorporated in the electric range, as well as a schematic diagram of the elements of the combination manual and clock-controlled selector switch.

Referring now to the drawing, the electric heating appliance 10 there illustrated and embodying the features of the present invention may take the form of an electric range comprising an upstanding body 11 provided with a substantially horizontal cooking top 12 supporting the different heating units including a deep well unit 13 and three surface units or hot plates 14, 15 and 16 arranged in spaced-apart relation on the left-hand side thereof. The body 11 houses an oven 17 in the right-hand portion thereof and a storage compartment 18 in the left-hand portion thereof, the oven 17 being accessible through a front opening provided with an associated door 19, and the storage compartment 18 being accessible through a front opening provided with an associated door 20.

The cooking top 12 carries an upstanding backsplasher 21 adjacent to the rear thereof that carries a deep well unit selector switch 22, three surface unit selector switches 23, 24 and 25 respectively corresponding to the surface units 14, 15 and 16, and an oven selector switch 26; all arranged in a horizontal row. Also, the backsplasher 21 carries a temperature responsive switch 27 operatively associated with the oven 17, and an electrical receptacle or outlet 28. Preferably, the thermal responsive switch 27 is provided with a manually rotatable and adjustable dial for selectively setting the temperature that is to be maintained in the oven 17, the dial of the thermal responsive switch being arranged in the horizontal row with the selector switches 22 to 26, inclusive. The receptacle 28 constitutes a convenient outlet adapted to receive the plug of a minor heating appliance, such, for example, as an electric coffee pot, and is preferably disposed below the dial of the thermal responsive switch 27. Further, the backsplasher 21 carries an oven master switch 31, a surface unit master switch 32 individually associated with the surface unit 16, a deep well master switch 33, and a receptacle master switch 34; all arranged in a vertical row behind the front surface of the backsplasher 21. The master switches 31 to 34, inclusive, are respectively provided with manually movable control elements or push buttons 35 to 38, inclusive, arranged in a vertical row and projecting through corresponding guide openings provided in the front wall of the backsplasher 21 and accessible from the front of the range 10. Finally, the backsplasher 21 carries clock or timer mechanism 40 commonly operatively associated with the master switches 31 to 34, inclusive. Preferably, the vertical row of push buttons 35 to 38, inclusive, are disposed to the left of the horizontal row of control switches 22 to 26, inclusive, and the clock mechanism 40 is disposed to the left of the vertical row of push buttons 35 to 38, inclusive; all as illustrated in Fig. 1.

Preferably the oven control switch 26 is of conventional construction including off, bake and broil positions; and each of the unit control switches 22 to 25, inclusive, includes off, high, second, third, low and warm positions. For example, the control switches 22 to 26, inclusive, may be of the types disclosed in U. S. Patent No. 2,203,236, granted on June 4, 1940 to Charles P. Randolph, et al. The thermal responsive switch 27 may be of any suitable type including a pair of contacts 27a that is opened when the temperature of the oven 17 rises slightly above the predetermined temperature set by the associated dial and that is closed when the temperature of the oven falls slightly below the predetermined temperature mentioned, in the usual manner.

As best shown in Fig. 2, the master switch 33 individually associated with the deep well unit 13 is mounted directly behind the front surface of the backsplasher 21 and comprises a front movable contact spring 51 and a rear stationary contact spring 52. The contact springs 51 and 52 are supported in insulated relation upon an associated bracket 53 welded or otherwise secured to the rear surface of the backsplasher 21. More particularly, the bracket 53 may be substantially channel-shaped in cross section including a rear flange 54 directly supporting the rear or fixed ends of the contact springs 51 and 52, the rear ends of the contact springs 51 and 52 being retained in position by two screws 55 extending through aligned openings provided in the contact springs 51 and 52, and through aligned openings provided in intervening insulators 56. Finally, the contact springs 51 and 52 respectively carry cooperating contacts 57 and 58 adjacent to the front or free ends thereof. The contacts 57 and 58 may be in the form of buttons welded or otherwise secured to the respective contact springs 51 and 52 and provided with an outer coating of silver, or the like, in order to insure a low resistance circuit between the contact springs 51 and 52 when the contact buttons 57 and 58 are moved into engagement or closed position. The front contact spring 51 is resilient and is normally biased or positioned away from the rear contact spring 52 in order normally to move the contacts 57 and 58 into open position; however, the front contact spring 51 may be moved against its bias toward the contact spring 52 in order to move the contacts 57 and 58 into closed position.

The push button 37 may be formed of any suitable insulating material, such, for example, as "Bakelite" and projects through an associated opening 61 formed in the front wall of the backsplasher 21. The push button 37 is provided with a convenient head or handle portion 62 readily accessible from the front of the range 10 and an operating projection 63 operatively associated with the front contact spring 51. Also, two spaced-apart notches 64 and 65 are provided in the opposite sides of the push button 37 and respectively cooperate with two resilient springs 66 and 67 welded, or otherwise secured, to the rear surface of the backsplasher 21. Accordingly, the push button 37 has an "out" position defined by the cooperation between the spring 66 and the notch 64, and an "in" position defined by the cooperation between the spring 67 and the notch 65. Thus when the push button 37 is moved or slid into its "out" position illustrated in Fig. 2, the spring 66 enters into the notch 64 in order to restrain it in place, and the operating projection 63 disengages or releases the associated front contact spring 51 so that the contacts 57 and 58 are moved into open position. On the other hand, when the push button 37 is moved or slid into its "in" position, the spring 67 enters the notch 65 in order to restrain it in place, and the operating projection 63 engages the associated front contact spring 51 so that the contacts 57 and 58 are moved into closed position.

The other master switches 31, 32 and 34 are constructed and arranged in a manner identical to the master switch 33 described above and are individually manually controllable by the respectively associated push buttons 35, 36 and 38 in an identical manner.

Further, the switching apparatus comprises a substantially L-shaped operating member or bell crank 71 pivotally mounted upon an upstanding shaft 72 carried by a substantially U-shaped bracket 73 welded, or otherwise secured, to the rear surface of the backsplasher 21 intermediate the vertical row of push buttons 35 to 38, inclusive, and the clock mechanism 40. The bell crank 71 comprises an operating arm 74 that is commonly associated operatively with the extreme free ends of the front springs incorporated in the master switches 31 to 34, inclusive, and a control arm 75 that is governed by the clock mechanism 40 in a manner more fully explained hereinafter. When the clock mechanism 40 governs the arm 75 in a first manner the bell crank 71 is rotated in the counterclockwise direction, as viewed in Fig. 2, whereby the arm 74 is moved toward the various front springs of the master switches 31, etc.; and when the clock mechanism 40 governs the arm 75 in a second manner the bell crank 71 is rotated in the clockwise direction, as viewed in Fig. 2, whereby the arm 74 is moved away from the various front springs of the master switches 31, etc. When the arm 74 of the bell crank 71 is moved toward the front springs of the master switches 31, etc., each of the front springs occupying its normal position is moved into its operated position in order to close the associated pair of contacts; while those of the front springs occupying their operated positions are not affected by this movement of the arm 74 of the bell crank 71. On the other hand, when the arm 74 of the bell crank 71 is moved away from the front springs of the master switches 31, etc., each of the front springs restrained in its operated position by the arm 74 is released so as to open the associated pair of contacts, while those of the front springs restrained in their operated positions by the associated push buttons 35, etc., are not affected by this movement of the arm 74. In view of the foregoing it will be understood that when any one of the push buttons, such, for example, as the push button 37 of the master switch 33 is moved into its "in" position, the associated front contact spring 51 is moved toward the associated rear contact spring 52 closing the pair of contacts 57—58 and moving the extreme free end of the front contact spring 51 out of the path of movement of the arm 74 of the bell crank 71, whereby the movements of the arm 74 of the bell crank 71 have no effect upon the master switch 33. On the other hand, when the push button 37 of the master switch 33 is moved into its "out" position, the associated front contact spring 51 is released opening the pair of contacts 57—58 and returning the extreme free end of the front contact spring 51 into the path of movement of the arm 74 of the bell crank 71, whereby the movements of the arm 74 of the bell crank 71 control operation of the master switch 33. Accordingly, when the push button 37 occupies its "in" position, control of the master switch 33 by the clock mechanism 40 is removed; and when the push button 37 occupies its "out" position, control of the master switch 33 by the clock mechanism 40 is restored.

As best shown in Figs. 2 and 3, the clock mechanism 40 comprises a principal casing 81 removably secured in any suitable manner, not shown, to the rear surface of the backsplasher 21, and a substantially centrally disposed auxiliary casing 82 carried by the rear wall of the main casing 81. The auxiliary casing 82 houses a synchronous motor 83 that is preferably of the "Telechron" type that is provided with electric supply leads 84 and an operating shaft 85 extending through an opening provided in the rear wall of the main casing 81. The synchronous motor 83 rotates the shaft 85 at a constant timed speed and comprises the essential prime mover of the clock mechanism 40. Also the clock mechanism 40 comprises a minute arbor 86 and a surrounding hour arbor 87 both projecting through an associated opening provided in the front wall of the backsplasher 21 and respectively carrying minute and hour hands 88 and 89 cooperating with a face 90 supported upon the front surface of the backsplasher 21. Also the clock mechanism 40 comprises an "on" setting arbor 91 and an "off" setting arbor 92 projecting through two associated openings provided in the front wall of the backsplasher 21 and respectively carrying control knobs 93 and 94. Finally, the clock mechanism 40 comprises a control arbor 95 projecting through an associated opening provided in the front wall of the backsplasher 21 and carrying a control handle 96. The control arbor 95 carries an operating member or cam 97 that projects through a slot 98 formed in the wall of the main casing 81 and cooperates with the arm 75 of the bell crank 71. The shaft 85 carries a pinion 101 that drives transmission mechanism, not shown, housed within the main casing 81. Also the shafts 86, 87, 91, 92 and 95 respectively carry pinions 102, 103, 104, 105 and 106, that are operatively connected with the transmission mechanism mentioned for a purpose more fully explained below. Finally, the clock mechanism 40 comprises a trim element 107 carried upon the front surface of the backsplasher 21 that supports a glass pane 108 covering the hands 88 and 89 and providing a finished appearance thereto from the front of the range 10. Certain of the actual details of the clock mechanism 40 have been omitted in the interests of brevity, as they form no part of the present invention, and since clock mechanisms of this character are well known.

Considering now the operation of the clock mechanism 40, it will be understood that the synchronous motor 83 controls the hands 88 and 89 cooperating with the face 90, whereby the usual clock function is obtained. The control knob 93 is operative to set a first time at which a first or "on" control is thereby exercised by the clock mechanism 40 upon the cam 97; and the control knob 94 is operative to set a second time at which a second or "off" control is thereby exercised by the clock mechanism 40 upon the cam 97. The cam 97 has three positions the first of which is illustrated in Fig. 3, wherein the handle 96 occupies its "off" position. When a timed operation is to be performed by the clock mechanism 40, the handle 96 is moved into its "on" position in order to move the cam 97 into its second position. Thereafter the clock mechanism 40 releases the cam 97 causing it to be moved into its third position as determined by the first time set by the control knob 93; and subsequently the clock mechanism 40 releases the cam 97 causing it to be moved from its third position back into its first position as determined by the second time set by the control knob 94, whereby the handle 96 is returned to its "off" position.

In order to illustrate the fundamental operation of the clock mechanism 40, it may be assumed that it is 5:00 o'clock p. m. and that the cook wishes to start a timed operation at 6:00 o'clock p. m. and to stop the timed operation at 7:00 o'clock p. m. The cook first sets the "on" control knob 93 to 6:00 o'clock and the "off" control knob 94 to 7:00 o'clock and then rotates the handle 96 from its "off" position into its "on" position. When the handle 96 is thus rotated from its "off" position into its "on" position, the cam 97 is moved from its first position into its second position. Thereafter at 6:00 o'clock the clock mechanism 40 releases the cam 97 effecting movement thereof from its second position into its third position, whereby the handle 96 is moved into an intermediate position with respect to its "on" and "off" positions indicating that the timing operation has begun. Thereafter at 7:00 o'clock the clock mechanism 40 again releases the cam 97 effecting movement thereof from its third position back through its first position, whereby the handle 96 is moved back into its "off" position indicating that the timing operation has been concluded.

As best shown in Fig. 3 the cam 97 comprises two flat cam surfaces 97a and 97b disposed at substantially 90 degrees with respect to each other and a third flat cam surface 97c disposed intermediate the cam surfaces 97a and 97b, the cam surface 97c being positioned further away from the longitudinal axis of the shaft 95 carrying the cam 97 than the cam surfaces 97a and 97b. Accordingly, when the cam 97 occupies its first position illustrated in Fig. 3, the cam surface 97a engages the arm 75 of the bell crank 71, whereby the bell crank 71 is retained in its normal position illustrated. Similarly, when the cam 97 occupies its second position, the cam surface 97b engages the arm 75 of the bell crank 71, whereby the bell crank 71 is retained in its normal position illustrated. On the other hand, when the cam 97 occupies its third position, the cam surface 97c engages the arm 75 of the bell crank 71, whereby the bell crank 71 is moved into its operated position.

The bell crank 71 may be restrained in its normal position illustrated in Fig. 3 by an arrangement including a coil spring diagrammatically indicated at 111; and, likewise, the movement of the cam 97 into its first or normal position as illustrated in Fig. 3 may be established by an associated stop pin diagrammatically illustrated at 112.

In view of the foregoing it will be understood that when the cam 97 occupies its first and second positions, the various master switches 31, etc., under the control of the clock mechanism 40 are moved into their open positions; and when the cam 97 occupies its third position, the various master switches 31, etc., under the control of the clock mechanism 40 are moved into their closed positions.

Finally, the range 10 comprises, as best shown in Fig. 3, a heating control system including a three-wire Edison source of current supply that may be of 230 volts A. C., the source including a neutral conductor 121 and two outside conductors 122 and 123. The various elements of the heating unit associated with the oven 17 are wired directly to the oven control switch 26 so that bake and broil heating connections may be made thereto. Likewise, the various elements of the surface unit 16 and of the deep well unit 13 are respectively wired directly to the surface control switch 25 and to the deep well control switch 22, so that the five individual heating connections previously mentioned may be made thereto. Likewise, the various elements of the surface units 14 and 15 are respectively wired in a manner, not shown, directly to the respective surface unit control switches 23 and 24 so that the five individual heating connections previously mentioned may be made thereto. The oven control switch 26 comprises two line terminals, one of which is connected to the outside conductor 123, and the other of which is connected to the contacts 27a controlled by the temperature responsive switch 27. The surface unit control switch 25 comprises three line terminals, two of which are respectively connected to the outside conductor 123 and to the neutral conductor 121 and the third of which is connected to the master switch 32. Likewise, the deep well control switch 22 comprises three line terminals, two of which are respectively connected to the outside conductor 123 and to the neutral conductor 121, and the third of which is connected to the master switch 33. The receptacle 28 comprises two terminals, one of which is connected to the neutral conductor 121 and the other of which is connected to the master switch 34. The other outside conductor 122 is connected in multiple to each of the master switches 31, 32, 33 and 34. Finally the master switch 31 is connected to the contacts 27a controlled by the temperature responsive switch 27; and the terminals of the synchronous motor 83 are directly connected respectively via the leads 84 to the outside conductor 122 and to the neutral conductor 121.

Considering now the operation of the electric control system as illustrated in Fig. 3, it is assumed that the push button 35 occupies its "in" position retaining closed the master switch 31 and removing control of the master switch 31 from the clock mechanism 40, and that the push buttons 36, 37 and 38 occupy their "out" positions opening the respective master switches 32, 33 and 34, and restoring control of the master switches 32, 33 and 34 to the clock mechanism 40. Accordingly, at this time since the master switch 31 occupies its closed position and is not under the control of the clock mechanism 40, the heating unit associated with the oven 17 may be controlled directly jointly by the oven control switch 26 and by the temperature responsive switch 27. Specifically, the oven control switch 26 may be set into any one of its positions in order to establish corresponding heating connections to the heating elements associated with the oven 17; and thereafter the temperature responsive switch 27 opens and closes the heating circuit extending to the heating unit associated with the oven 17 in accordance with the temperature of the oven 17 in the usual manner.

On the other hand, the control of the surface unit 16 is governed jointly by the surface control switch 25 and the clock mechanism 40; the control of the deep well unit 13 is governed jointly by the deep well control switch 22 and the clock mechanism 40; and the control of the receptacle 28 is governed directly by the clock mechanism 40. For example, the surface control switch 25 may be set into any one of its positions to establish the corresponding heating connection to the surface unit 16 and thereafter the clock mechanism 40 governs the master switch 32 in order to operate it first into its closed position at a first preselected time and then to operate it into its open position at a second preselected time. The control of the deep well unit 13 by the clock mechanism 40 is identical to that of the surface unit 16; and the control of the receptacle 28 by the clock mechanism 40 is obvious in view of the foregoing explanation.

It will be understood that the control of the oven 17 may be placed under the clock mechanism 40 by operating the push button 35 into its "out" position and that the control of the surface unit 16 may be removed from the clock mechanism 40 by operating the push button 36 into its "in" position. Accordingly, any combination of the oven 17, the surface unit 16, the deep well unit 13 and the receptacle 28 may be placed under the control of the clock mechanism 40 or removed therefrom as desired by appropriate manipulation of the respective push buttons 35 to 38, inclusive. Of course, when all of the push buttons 35 to 38, inclusive, occupy their "in" positions, the control of all of the units mentioned is removed from the clock mechanism 40; and when all of the push buttons 35 to 38, inclusive, occupy their "out" positions, the control of all of the units mentioned is restored to the clock mechanism 40. This heating system is very advantageous as it permits complete flexibility of control of the heating units described above. In passing it is noted that the control switches 26, 25 and 22 are so connected and arranged that no electrical heating circuits to the respectively associated heating units may be completed therein when the respective master switches 31, 32 and 33 occupy their open positions as the completion of all heating circuits is dependent upon the utilization of the outside conductor 122 either with the neutral conductor 121 or with the outside conductor 123. However, when one of the control switches 26, 25 or 22 occupies its "off" position, no heating circuits can be completed to the associated heating unit as the circuits are opened within the control switch and without regard to the position of the respectively associated master switch 31, 32 or 33.

In view of the foregoing it is apparent that there has been provided a heating appliance in the form of an electric range incorporating an improved and exceedingly flexible heating control system that utilizes an improved and exceedingly simple combination manual and clock-controlled selector switch.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Switching apparatus comprising a movable member having first and second and third positions, manual means for moving said member from its first position into its second position, clock mechanism for effecting movement of said member from its second position into its third position at a first preselected time and for effecting movement of said member from its third position back into its first position at a second preselected time, a plurality of movable switch springs commonly associated with said member, each one of said switch springs being biased into a first position and being movable against said bias into a second position, a plurality of manually movable control elements respectively associated with said switch springs, each one of said control elements being movable into one position to move the associated one of said switch springs into its second position and being movable into another position to release the associated one of said switch springs to be returned back into its first position, means responsive to movement of said member into its third position for moving each one of said switch springs occupying its first position into its second position, means responsive to movement of said member back into its first position for releasing each one of said switch springs moved by said last-mentioned means into its second position to be returned back into its first position, and a plurality of sets of switch contacts respectively operatively associated with said switch springs, each one of said sets of switch contacts being selectively operated between open and closed positions by the movements of the associated one of said switch springs between its first and second positions.

2. Switching apparatus comprising a movable member having first and second and third positions, manual means for moving said member from its first position into its second position, clock mechanism for effecting movement of said member from its second position into its third position at a first preselected time and for effecting movement of said member from its third position back into its first position at a second preselected time, a plurality of movable switch springs commonly associated with said member, each one of said switch springs being biased into a first position and being movable against said bias into a second position, a plurality of manually movable control elements respectively associated with said switch springs, each one of said control elements being movable into one position to move the associated one of said switch springs into its second position and to remove control thereof from said member and being movable into another position to release the associated one of said switch springs to be returned back into its first position and to restore control thereof to said member, means responsive to movement of said member into its third position for moving each one of said switch springs under control thereof into its second position, means responsive to movement of said member back into its first position for releasing each one of said switch springs under control thereof to be returned back into its first position, and a plurality of sets of switch contacts respectively operatively associated with said switch springs, each one of said sets of switch contacts being selectively operated between open and closed positions by the movements of the associated one of said switch springs between its first and second positions.

3. Switching apparatus comprising a movable member having first and second and third positions, manual means for moving said member from its first position into its second position, clock mechanism for effecting movement of said member from its second position into its third position at a first preselected time and for effecting movement of said member from its third position back into its first position at a second preselected time, a plurality of movable switch springs commonly associated with said member, each one of said switch springs being biased into a first position and being movable against said bias into a second position, a plurality of manually movable push buttons respectively associated with said switch springs, each one of said push buttons being movable into an in position to move the associated one of said switch springs into its second position and being movable into an out position to release the associated one of said switch springs to be returned back into its first position, means responsive to movement of each one of said push buttons into its in position for restraining it therein, means responsive to movement of said member into its third position for moving each one of said switch springs occupying its first position into its second position, means responsive to movement of said member back into its first position for releasing each one of said switch springs moved by said last-mentioned means into its second position to be returned back into its first position, and a plurality of sets of switch contacts respectively operatively associated with said switch springs, each one of said sets of switch contacts being selectively operated between open and closed positions by the movements of the associated one of said switch springs between its first and second positions.

4. Switching apparatus comprising a movable member having first and second and third positions, manual means for moving said member from its first position into its second position, clock mechanism for effecting movement of said member from its second position into its third position at a first preselected time and for effecting movement of said member from its third position back into its first position at a second preselected time, a plurality of switches commonly associated with said member, each one of said switches having first and second positions, a plurality of manually movable control elements respectively associated with said switches, each one of said control elements being movable into one position to operate the associated one of said switches into its second position and to remove control thereof from said member and being movable into another position to operate the associated one of said switches into its first position and to restore control thereof to said member, means responsive to movement of said member into its third position for operating each one of said switches under control thereof into its second position, and means responsive to movement of said member back into its first position for operating each one of said switches under control thereof into its first position.

5. Switching apparatus comprising a supporting panel, a movable member carried on one side of said panel and having first and second and third positions, manual means carried on the other side of said panel for moving said member from its first position into its second position, clock mechanism carried on said one side of said panel for effecting movement of said member from its second position into its third position at a first preselected time and for effecting movement of said member from its third position back into its first position at a second preselected time, manual means carried on said other side of said panel for selectively setting said first and second times, a plurality of switches carried on said one side of said panel and commonly associated with said member, each one of said switches having first and second positions, a plurality of manually movable push buttons mounted in said panel and extending therethrough and accessible from said other side thereof, each one of said push buttons being movable into an in position with respect to said other side of said panel to operate the associated one of said switches into its second position and to remove control thereof from said member and being movable into an out position with respect to said other side of said panel to operate the associated one of said switches into its first position and to restore control thereof to said member, means responsive to movement of said member into its third position for operating each one of said switches under control thereof into its second position, and means responsive to movement of said member back into its first position for operating each one of said switches under control thereof into its first position.

6. In an electric heating appliance including a plurality of heating units, a plurality of heating control circuits respectively extending to said heating units, a source of current supply, and a plurality of manually operable multi-position control switches respectively arranged between said source and said heating control circuits, each one of said control switches being selectively operative to its different positions to establish corresponding different heating connections via the associated one of said heating control circuits to the associated one of said heating units; the combination comprising a plurality of master switches respectively arranged between said source and said control switches, each one of said master switches being operative to an open position to interrupt the supply of current from said source to the associated one of said control switches and being operative to a closed position to complete the supply of current from said source to the associated one of said control switches, a plurality of manually movable control elements respectively associated with said master switches, each one of said control elements being movable into one position to operate the associated one of said master switches into its closed position and being movable into another position to operate the associated one of said master switches into its open position, a movable member commonly associated with said master switches and having first and second and third positions, means responsive to movement of said member into its third position for operating each one of said master switches occupying its open position into its closed position, means responsive to movement of said member back into its first position for operating each one of said master switches operated by said last-mentioned means into its open position, manual means for moving said member from its first position into its second position, and clock mechanism for effecting movement of said member from its second position into its third position at a first preselected time and for effecting movement of said member from its third position back into its first position at a second preselected time.

7. In an electric range including an oven provided with a first heating unit and a hot plate provided with a second heating unit, first and second heating control circuits respectively extending to said first and second heating units, a source of current supply, and first and second manually operable multi-position control switches respectively arranged between said source and said first and second heating control circuits, said first control switch being selectively operative to an off position and to bake and broil positions respectively to interrupt said first heating control circuit and to establish bake and broil heating connections between said first heating control circuit and said first heating unit, said second control switch being selectively operative to an off position and to high and low positions respectively to interrupt said second heating control circuit and to establish high and low heating connections between said second heating control circuit and said second heating unit; the combination comprising first and second master switches respectively arranged between said source and said first and second control switches, each one of said master switches being operative to an open position to interrupt the supply of current from said source to the associated one of said control switches and being operative to a closed position to complete the supply of current from said source to the associated one of said control switches, first and second manually movable control elements respectively associated with said first and second master switches, each one of said control elements being movable into one position to operate the associated one of said master switches into its closed position and being movable into another position to operate the associated one of said master switches into its open position, a movable member commonly associated with said first and second master switches and having first and second and third positions, means responsive to movement of said member into its third position for operating each one of said master switches occupying its open position into its closed position, means responsive to movement of said member back into its first position for operating each one of said master switches operated by said last-mentioned means into its open position, manual means for moving said member from its first position into its second position, and clock mechanism for effecting movement of said member from its second position into its third position at a first preselected time and for effecting movement of said member from its third position back into its first position at a second preselected time.

8. In an electric heating appliance including a plurality of heating units, a plurality of heating control circuits respectively extending to said heating units, a source of current supply, and a plurality of manually operable multi-position control switches respectively arranged between said source and said heating control circuits, each one of said control switches being selectively operative to its different positions to establish corresponding different heating connections via the associated one of said heating control circuits to the associated one of said heating units; the combination comprising a plurality of master switches respectively arranged between said source and said control switches, each one of said master switches being operative to an open position to interrupt the supply of current from said source to the associated one of said control switches and being operative to a closed position to complete the supply of current from said source to the associated one of said control switches, a plurality of manually movable control elements respectively associated with said master switches, each one of said control elements being movable into one position to operate the associated one of said master switches into its closed position and being movable into another position to operate the associated one of said master switches into its open position, a movable member commonly associated with said master switches and having two positions, means responsive to movement of said member into one of its positions for operating each one of said master switches occupying its open position into its closed position, means responsive to movement of said member back into the other of its positions for operating each one of said master switches operated by said last-mentioned means into its open position, means for moving said member into its one position, and timing mechanism for effecting movement of said member into its other position a preselected elapsed time interval after movement thereof into its one position.

9. In an electric heating appliance including a plurality of heating units, a plurality of heating control circuits respectively extending to said heating units, a source of current supply, and a plurality of manually operable multi-position control switches respectively arranged between said source and said heating control circuits, each one of said control switches being selectively operative to its different positions to establish corresponding different heating connections via the associated one of said heating control circuits to the associated one of said heating units; the combination comprising a plurality of master switches respectively arranged between said source and said control switches, each one of said master switches being operative to an open position to interrupt the supply of current from said source to the associated one of said control switches and being operative to a closed position to complete the supply of current from said source to the associated one of said control switches, a plurality of manually movable control elements respectively associated with said master switches, each one of said control elements being movable into one position to operate the associated one of said master switches into its closed position and being movable into another position to operate the associated one of said master switches into its open position, a member commonly associated with said master switches and selectively movable into first and second position respectively to operate each one of said master switches occupying its open position into its closed position and to operate each one of said master switches operated thereby back into its open position, and clock mechanism for selectively moving said member into its first and second positions at respective preselected first and second times.

10. In an electric heating appliance including a plurality of heating units, a plurality of heating control circuits respectively extending to said heating units, a source of current supply, and a plurality of manually operable multi-position control switches respectively arranged between said source and said heating control circuits, each one of said control switches being selectively operative to its different positions to establish corresponding different heating connections via the associated one of said heating control circuits to the associated one of said heating units; the combination comprising a plurality of master switches respectively arranged between said source and said control switches, each one of said master switches being operative to an open position to interrupt the supply of current from said source to the associated one of said control switches and being operative to a closed position to complete the supply of current from said source to the associated one of said control switches, a plurality of manually movable control elements respectively associated with said master switches, each one of said control elements being movable into one position to operate the associated one of said master switches into its closed position and being movable into another position to operate the associated one of said master switches into its open position, and clock mechanism for operating each one of said master switches occupying its open position into its closed position at a first preselected time and for operating each one of said master switches operated thereby back into its open position at a second preselected time.

11. In an electric range including a heating unit and an outlet receptacle, first and second circuits respectively extending to said heating unit and to said outlet receptacle, a source of current supply, and a manually operable multi-position control switch arranged between said source and said first circuit and selectively operative to its different positions to establish corresponding different heating connections via said first circuit to said heating unit; the combination comprising a first master switch arranged between said source and said control switch, a second master switch arranged between said source and said second circuit, said first master switch being operative to an open position to interrupt the supply of current from said source to said control switch and being operative to a closed position to complete the supply of current from said source to said control switch, said second master switch being operative to an open position to interrupt the supply of current from said source to said second circuit and being operative to a closed position to complete the supply of current from said source to said second circuit, first and second manually movable control elements respectively associated with said first and second master switches, each one of said control elements being movable into one position to operate the associated one of said master switches into its closed position and being movable into another position to operate the associated one of said master switches into its open position, a movable member commonly associated with said first and second master switches and having first and second and third positions, means responsive to movement of said member into its third position for operating each one of said master switches occupying its open position into its closed position, means responsive to movement of said member back into its first position for operating each one of said master switches operated by said last-mentioned means into its open position, manual means for moving said member from its first position into its second position, and clock mechanism for effecting movement of said member from its second position into its third position at a first preselected time and for effecting movement of said member from its third position back into its first position at a second preselected time.

HERMAN W. SCHULZE.

REFERENCES CITED

The following references are of record in the file of this patent:

UNITED STATES PATENTS

| Number | Name | Date |
| --- | --- | --- |
| 1,795,753 | Bonn | Mar. 10, 1931 |
| 2,116,787 | Hart | May 10, 1938 |
| 2,329,417 | Pearce | Sept. 14, 1943 |